(12) United States Patent
Hsu et al.

(10) Patent No.: US 9,416,267 B2
(45) Date of Patent: Aug. 16, 2016

(54) BLEND COMPOSITION, FLEXIBLE TUBING MATERIAL AND METHOD OF MAKING THE BLEND

(75) Inventors: Shaw Ling Hsu, Sunderland, MA (US); Sahas Rathi, Westborough, MA (US); Edward Coughlin, Amherst, MA (US); Xiaolang Chen, Chengdu (CN); Charles S. Golub, Westford, MA (US); Michael J. Tzivanis, Chicopee, MA (US); Michael A. Zimmerman, North Andover, MA (US); Nicholas Orf, Natick, MA (US); Choung H. Lai, Acton, MA (US)

(73) Assignees: SAINT-GOBAIN PERFORMANCE PLASTICS CORPORATION, Solon, OH (US); UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 13/456,146

(22) Filed: Apr. 25, 2012

(65) Prior Publication Data

US 2012/0270979 A1    Oct. 25, 2012

Related U.S. Application Data

(60) Provisional application No. 61/478,798, filed on Apr. 25, 2011, provisional application No. 61/539,374, filed on Sep. 26, 2011.

(51) Int. Cl.
*C08L 67/04* (2006.01)
*C08K 5/103* (2006.01)
*C08L 101/12* (2006.01)
*C08L 101/16* (2006.01)
*B29C 45/00* (2006.01)

(52) U.S. Cl.
CPC ............... *C08L 67/04* (2013.01); *C08K 5/103* (2013.01); *C08L 101/12* (2013.01); *C08L 101/16* (2013.01); *B29C 2045/0091* (2013.01); *C08L 2205/02* (2013.01)

(58) Field of Classification Search
CPC ............................. C08L 67/04; C08L 2205/02
USPC ................. 525/410, 411, 415, 450, 403, 408
See application file for complete search history.

(56) References Cited

U.S. PATENT DOCUMENTS

| | | | |
|---|---|---|---|
| 5,593,778 A | 1/1997 | Kondo et al. | |
| 6,365,173 B1* | 4/2002 | Domb et al. | 424/426 |
| 2006/0018872 A1 | 1/2006 | Tew et al. | |
| 2008/0039579 A1* | 2/2008 | Kimura | C08G 63/06 524/556 |
| 2008/0097074 A1* | 4/2008 | Ouchi et al. | 528/354 |
| 2008/0188629 A1 | 8/2008 | Yano | |
| 2009/0239433 A1 | 9/2009 | Kurihara et al. | |
| 2009/0263457 A1 | 10/2009 | Trollsas et al. | |
| 2009/0281249 A1 | 11/2009 | Thatcher et al. | |
| 2010/0056700 A1 | 3/2010 | Chung et al. | |
| 2010/0056751 A1 | 3/2010 | Toyohara et al. | |
| 2010/0324229 A1* | 12/2010 | Komazawa | C08G 63/08 525/450 |
| 2012/0238652 A1 | 9/2012 | Uehara | |

FOREIGN PATENT DOCUMENTS

| | | |
|---|---|---|
| EP | 1953191 A1 | 8/2008 |
| EP | 2116575 A1 | 11/2009 |
| EP | 2476729 A1 | 7/2012 |
| JP | 2009001637 A | 1/2009 |
| JP | 2011149021 A | 8/2011 |
| JP | 2011153275 A | 8/2011 |
| JP | 2012031340 A | 2/2012 |
| KR | 100186726 B1 | 5/1999 |
| KR | 20070059075 A | 6/2007 |
| WO | 2009129503 A2 | 10/2009 |
| WO | 2010038860 A | 4/2010 |
| WO | 2010053592 A1 | 5/2010 |
| WO | 2011030766 A | 3/2011 |
| WO | 2011129771 A1 | 10/2011 |
| WO | 2012149071 A2 | 11/2012 |

OTHER PUBLICATIONS

Ljungberg, N.; Wesslen, B.; Biomacromolecules, 2005, p. 1789-1796.*
Kricheldorf, H.R., et al.; Macromolecules, 2005, vol. 38, p. 7018-7025.*
Sheth, M., et al.; Journal of Applied Polymer Science, 1997, p. 1495-1505.*
Rathi, Sahas et al., "Toughening semicrystalline poly(lactic acid) by morphology alteration", Polymer 2011, vol. 52, 4184-4188. (Jul. 28, 2011).
Stevels, Willem M., et al., "Stereocomplex formation in ABA triblock copolymers of poly(lactide) (A) and poly(ethylene glycol) (B)", Macromol. Chem. Phys. 1995, vol. 196, 3687-3694.
Lim, Dong Woo et al., "A new class of biodegradable hydrogels sterocomplexed by enatiomeric oligo(lactide) side chains of poly(HEMA-g-OLA)s", Macromol. Rapid Commun. 2000, vol. 21, 464-471.
International Search Report for PCT/US2012/035068 dated Nov. 23, 2012, 6 pgs.

* cited by examiner

*Primary Examiner* — Robert Jones, Jr.
(74) *Attorney, Agent, or Firm* — Abel Law Group, LLP; Chi Suk Kim

(57) ABSTRACT

A composition includes a blend of (a) a multi-block copolymer including at least one block of an elastomeric polymer and at least one block of a first polymer including a chiral polymer having a stereo isomeric configuration; and (b) a second polymer including an anti-chiral polymer corresponding to the chiral polymer in (a), wherein the second polymer includes an opposite handed stereo isomeric configuration to the chiral polymer in (a); wherein the blend of the chiral polymer and the anti-chiral polymer form stereo complex sites. A flexible tubing material further includes the blend. In an embodiment, a method of making the blend material is also provided.

24 Claims, 2 Drawing Sheets

BLEND COMPOSITION, FLEXIBLE TUBING MATERIAL AND METHOD OF MAKING THE BLEND

CROSS-REFERENCE TO RELATED APPLICATION(S)

The present application claims priority from U.S. Provisional Patent Application No. 61/478,798, filed Apr. 25, 2011 and 61/539,374, filed Sep. 26, 2011 both entitled "A BLEND COMPOSITION, FLEXIBLE TUBING MATERIAL AND METHOD OF MAKING THE BLEND," both naming inventors Shaw Ling Hsu et al., which both applications are incorporated by reference herein in its entirety.

FIELD OF THE DISCLOSURE

This disclosure, in general, relates to a blend composition, a flexible material and methods of making the aforementioned blend.

BACKGROUND

Currently, flexible medical tubing is used to transport any variety of liquids during medical procedures. A flexible polyvinyl chloride (PVC) is a typical material used for medical tubing due to their inherent flexibility and translucency. Unfortunately, polyvinyl chloride tubing has significant amounts of low-molecular weight chemicals that can leach during medical treatments. Further, the disposal of PVC-based waste by incineration causes environmental issues due to the release of toxic gases.

Alternative materials to flexible PVC have been adopted to make flexible medical tubing. Polymers that may be desired typically include those that are flexible, transparent, and appropriate for certain applications. Unfortunately, many polymers may not have all the physical or mechanical properties desired. For instance, inherently rigid polymers, such as semi-crystalline polymers, need to be modified to be appropriately utilized in certain applications where flexibility and increased tensile strength are desired. However, modification is difficult for semi-crystalline polymers.

As such, an improved polymeric material that has improved mechanical properties is desired.

SUMMARY

In a particular embodiment, a composition includes a blend of (a) a multi-block copolymer including at least one block of an elastomeric polymer and at least one block of a first polymer including a chiral polymer having a stereo isomeric configuration; and (b) a second polymer including an anti-chiral polymer corresponding to the chiral polymer in (a), wherein the second polymer includes an opposite handed stereo isomeric configuration to the chiral polymer in (a); wherein the blend of the chiral polymer and the anti-chiral polymer form stereo complex sites.

In an embodiment, a flexible tubing material includes a blend of (a) a multi-block copolymer including at least one block of an elastomeric polymer and at least one block of a first polymer including a chiral polymer having a stereo isomeric configuration; and (b) a second polymer including an anti-chiral polymer corresponding to the chiral polymer in (a), wherein the second polymer includes an opposite handed stereo isomeric configuration to the chiral polymer in (a); wherein the blend of the chiral polymer and anti-chiral polymer form stereo complex sites.

In another exemplary embodiment, a method of making a blend composition includes providing (a) a multi-block copolymer including at least one block of an elastomeric polymer and at least one block of a first polymer including a chiral polymer having a stereo isomeric configuration; blending the multi-block copolymer with (b) a second polymer including an anti-chiral polymer corresponding to the chiral polymer in (a), wherein the second polymer includes an opposite handed stereo isomeric configuration to the chiral polymer in (a), wherein the blend of the chiral polymer and the anti-chiral polymer form stereo complex sites; and extruding or molding the blend.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
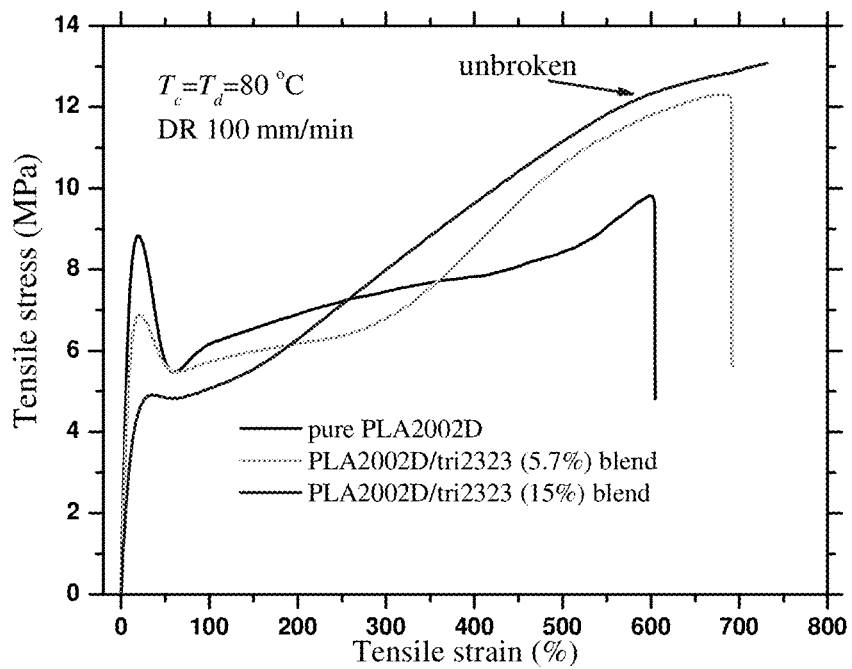
FIG. 1 includes a graphical illustration of stress strain curves at 80° C. of blends of a multi-block copolymer with a second polymer.

In a particular embodiment, a composition includes a blend of (a) a multi-block copolymer and (b) a second polymer. In an embodiment, the multi-block copolymer includes at least one block of an elastomeric polymer and at least one block of a first polymer that is a chiral polymer. As a chiral polymer, the polymer has a stereo isomeric configuration. The second polymer of the blend includes an anti-chiral polymer corresponding to the chiral polymer in (a), the anti-chiral polymer having the opposite handed stereo isomeric configuration of the chiral polymer of the multi-block copolymer in (a). In a particular embodiment, the blend containing the chiral polymer with a stereo isomeric configuration and the anti-chiral polymer with the opposite handed stereo isomeric configuration form stereo complex sites. In a particular embodiment, the resulting blend composition has desirable flexibility for applications such as flexible PVC applications.

In a particular embodiment, the first polymer and the second polymer of the blend are any reasonable chiral polymer and its corresponding anti-chiral polymer. In an embodiment, the chiral/anti-chiral polymer pair may be any stereo complex polymer system or any racemic polymer system. In a particular embodiment, the chiral polymer and anti-chiral polymer provide rigid and soft segments, the soft segment providing flexibility to the blend. The chiral polymer and the anti-chiral polymer may be any polyenantiomer pair such as, but not limited to, poly(lactic acid); poly(3-hexylthiophene); syndiotactic polypropylene; ionomers; polymethacrylates such as polymethylmethacrylate and poly(N,N-dimethylamino-2-ethyl methacrylate); polystyrene and copolymers thereof; poly(β-propiolactones); the like, or combinations thereof. In an embodiment, the chiral/anti-chiral polymer used as the first polymer and the second polymer are poly(lactic acid). In another embodiment, the chiral/anti-chiral polymer used as the first polymer and the second polymer are syndiotactic polypropylene, polystyrene, or combinations thereof.

In an embodiment, the complementing polymer molecules forming the stereocomplex can be a pair of isotactic and syndiotactic, not necessarily optically active polymers or two opposite enantiomeric, optically active polymer chains with identical chemical compositions or similar but not identical chemical structures. Apart from these homo-stereocomplexes, hetero-stereocomplexes can also be formed by polymers from different polymer families (like polyesters and polyamides) having opposite stereoregular configuration. Some specific polymers classes reported to form stereocomplexes are poly(lactones), polyesters, polyamides, polyketones, poly(carbonates), polysulfides, poly(acrylates). Specific examples from these classes include poly(lactic acid), poly($\alpha$-methyl-$\alpha$-ethyl-$\beta$-propiolactones), poly($\gamma$-benzyl glutamate), poly(olefin-carbon monoxides) like poly(propylene-carbon monoxide), poly(propylene carbonate), poly(epichlorohydrin), poly(t-butyl thiirane), poly(t-butyl ethyleneoxide) and poly(methyl methacrylate). In a particular embodiment with a homo-stereocomplex or a hetero-stereocomplex, the formation of the stereocomplex site forms a crosslink or a bridge between the polymer chains.

In an embodiment, the first polymer of the multi-block copolymer and the second polymer are poly(lactic acids). Typically, a poly(lactic acid) is substantially composed of stereo isomers, i.e. an L-isomer unit or a D-isomer unit represented by the following chemical formula (1).

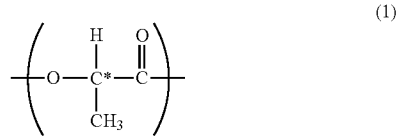

(1)

In the above chemical formula (1), C* represents an asymmetric carbon, and an S-configuration based on this asymmetric carbon provides an L-isomer unit, while an R-configuration provides a D-isomer unit. A poly(lactic acid) with an L-isomer unit is herein referred to a poly-L-lactic acid (PLLA). A poly(lactic acid) with a D-isomer unit is herein referred to a poly-D-lactic acid (PDLA). The first polymer of a poly(lactic acid) is a major component of the multi-block copolymer. Further, the multi-block copolymer is blended with a second polymer of a poly(lactic acid). In an embodiment, the poly-lactic acid of the first polymer and the second polymer may include both L-isomers and D-isomers.

In an embodiment, the multi-block copolymer includes at least one block of a first polymer that is the chiral polymer and at least one block of an elastomeric polymer. Any elastomeric polymer is envisioned that has a glass transition temperature not greater than the glass transition temperature of the matrix material. In an embodiment, the glass transition temperature is not greater than room temperature, i.e. 25° C. Any elastomeric polymer that is miscible or immiscible with the matrix material is envisioned. In an embodiment, the elastomeric polymer is at least semi-miscible with the matrix material. "Semi-miscible" as used herein refers to an elastomer polymer that, when blended as a component of the multi-block polymer with the second polymer, exhibits uniform physical properties such as a singular glass transition temperature or a broadening of the glass transition temperature. In an embodiment, the elastomeric polymer may have any carbon repeat unit having the ability to copolymerize with the first polymer of the multi-block copolymer. For instance, the elastomeric polymer may be any reasonable ether, olefin, vinyl, polyurethane, acrylate, vinyl alcohol, ethylene copolymer, ester, silicone, fluoropolymer, or combination thereof envisioned. In an embodiment, the elastomeric polymer is polyethylene oxide (PEO)/polyethylene glycol (PEG), polytriethylene glycol, polytetraethylene glycol, polybutadiene, hydrogenated butadiene, polyisobutylene, polyisoprene, polystyrene-butadiene, acrylonitrile rubber, derivatives of vegetable oils, polypropylene glycol (PPG), polytetra methylene ether glycol (PTMEG), polycaprolactone, poly(para-dioxanone), poly(propylene carbonate), poly(tetramethyleneadipate-co-terephthalate), poly(butylene adipate-co-terephthalate), poly(butylene succinate), polyhydroxyalkanoates, polyurethanes, acrylates, olefins, vinyl alcohols, ethylene copolymers, blends, or combinations thereof. In a particular embodiment, the elastomeric polymer is polyethylene oxide, such as polyethylene glycol (PEG), polypropylene glycol (PPG), a copolymer of polyethylene glycol and propylene glycol (PEPG), or combination thereof. In an embodiment, the blend includes polyethylene oxide as the elastomeric component in the multi-block copolymer and poly(lactic acid) as the first polymer and second polymer. In an embodiment, the elastomeric polymer is ethylene butadiene. For instance, the blend includes ethylene butadiene as the elastomeric component in the multi-block copolymer and the first polymer and second polymer are syndiotactic polypropylene, polystyrene, or combinations thereof. The elastomeric polymer may be linear, non-linear, or aromatic. Further, the elastomeric polymer can be derived from sustainable or non-sustainable resources. The elastomeric polymer is typically present in the multi-block copolymer at an amount of about 1 wt % to about 99 wt %, such as about 3 wt % to about 50 wt % based on the total weight of the multi-block copolymer.

Any number of blocks of the multi-block copolymer may be envisioned to form a diblock copolymer, a triblock copolymer, a star copolymer, a graft copolymer, and a hyperbranched copolymer. In an embodiment, the multi-block copolymer includes at least one block of an elastomeric polymer and at least one block of a first polymer that is a chiral polymer. In another embodiment, the multi-block copolymer includes at least two blocks of a first polymer that is a chiral polymer. For instance, the end blocks may or may not be the same polymer. In an embodiment, the end block may be a chiral polymer or an elastomeric polymer. For instance, a styrene-butadiene-styrene has the same end blocks but a four block styrene-butadiene-styrene-butadiene copolymer has different end blocks. In an embodiment, at least two end-blocks of the multi-block copolymer may be the same or different handed stereo isomers. In a particular embodiment, the multi-block copolymer includes at least two blocks of a first polymer including a chiral polymer, wherein at least two end-blocks of the multi-block copolymer are the same handed stereo isomers. The multi-block copolymer may further include opposite handed stereoisomers of the chiral polymer. The second polymer includes the opposite handed stereoisomers of the chiral polymer that, when blended with the multi-block copolymer, form stereo complex sites. As an exemplary embodiment, the same handed stereo isomers of the at least two end-blocks may be D isomers of poly(lactic acid). When the at least two end-block are D-isomers, the multi-block copolymer may further include L-isomers. In another embodiment, the same handed stereo isomers of the at least two end-blocks may be L-isomers of the poly(lactic acid). When the at least two end-block are L-isomers, the multi-block copolymer may further include D-isomers. The second polymer includes poly(lactic acid), wherein the second polymer includes at least one opposite handed stereo isomers to the same handed poly(lactic acid) stereo isomers in the multi-block copolymer. In a particular embodiment, the blend containing the same handed stereo isomers and opposite handed stereo isomers form stereo complex sites. In a particular embodiment, the same handed stereo isomers of the multi-block copolymer are present at an amount of at least about 1% to about 99% by weight, based on the total weight of the multi-block copolymer. In a particular embodiment, the multi-block copolymer is a chiral polymer that contains predominantly the same handed stereo isomers to the opposite handed stereo isomers of the second anti-chiral polymer. "Predominantly" as used herein refers to an amount of the same handed stereo isomers sufficient to form a stereo complex with the opposite handed stereo isomers of the second polymer.

Typically, the multi-block copolymer is blended with the second polymer. In an embodiment, the second polymer is the anti-chiral polymer having the opposite handed stereo isomer of the chiral polymer of the first polymer. For instance, the first polymer is a poly(lactic acid) and the second polymer is a poly(lactic acid). In an exemplary embodiment, the second polymer is a poly(lactic acid) that contains at least one opposite handed stereo isomer to the same handed stereo isomer of the first poly(lactic acid) of the multi-block copolymer. In an embodiment, the opposite handed stereo isomer of the second polymer are present at an amount of at least about 1% to about 99% by weight, based on the total weight of the second polymer. In a particular embodiment, the second polymer is an anti-chiral polymer that contains predominantly the opposite handed stereo isomers to the same handed stereo isomers of the first chiral polymer of the multi-block copolymer. "Predominantly" as used herein refers to an amount of the opposite handed stereo isomers sufficient to form a stereo complex with the same handed stereo isomers of the multi-block copolymer. For instance, when the multi-block copolymer predominantly has D-isomers, the second poly(lactic acid) has predominantly L-isomers. When the second poly (lactic acid) has predominantly L-isomers, the second poly (lactic acid) may further include D-isomers. In another embodiment, when the multi-block copolymer predominantly has L-isomers, the second poly(lactic acid) has predominantly D-isomers. When the second poly(lactic acid) has predominantly D-isomers, the second poly(lactic acid) may further include L-isomers. In an embodiment, the second polymer may further include at least one block of an elastomeric polymer as described above.

In an embodiment, at least the first polymer of the multi-block copolymer or the second polymer predominantly has a stereo isomeric structure. In an example, at least the first poly(lactic acid) of the multi-block copolymer or the second poly(lactic acid) has predominantly L-isomers making it semi-crystalline. Typically, a semi-crystalline polymer refers to a polymer wherein the molecules pack together in a three-dimensional crystalline lattice together with disordered chains. Typically, the semi-crystalline polymers have a crystallinity of about a 1% to about 70%, as measured by density, X-Ray diffraction, or DSC (Differential Scanning calorimetry). In an embodiment, the first polymer of the multi-block copolymer or the second polymer has predominantly stereo isomers with a crystallinity greater than about 15%, such as greater than about 25%, such as greater than about 30%, such as greater than about 50%, or even greater than about 70%, as measured by density, X-ray diffraction, or DSC. Specifically, an inherently rigid semi-crystalline polymer can be blended and, e.g. with the present invention, the mechanical properties of the semi-crystalline polymer are maintained but with the toughening characteristic of the elastomeric portion of the multi-block copolymer or elastomeric portion of the second polymer. Toughening is achieved with minimal loss in the mechanical properties of the semi-crystalline polymer. In an embodiment, the first poly(lactic acid) of the multi-block copolymer or the second poly(lactic acid) has predominantly L-isomers with a crystallinity greater than about 15%, such as greater than about 25%, such as greater than about 30%, such as greater than about 50%, or even greater than about 70% as measured by density, X-ray diffraction, or DSC.

In an embodiment, the weight average molecular weight of the first polymer and the second polymer is in a range to provide stereo complex sites when blending the multi-block copolymer with the second polymer. Typically, the weight average molecular weight of the first polymer and the second polymer is dependent upon the chiral polymer and corresponding anti-chiral polymer chosen. In an embodiment, for example, the weight average molecular weight of the poly (lactic acid) may be, but not limited to, at least about 1,000, such as from about 1,000 to about 500,000, such as from about 3,000 to about 250,000. In an embodiment, the weight average molecular weight of the poly(lactic acid) outside the range may make it difficult to obtain stereo complex sites and in particular, stereo complex crystalline sites, when blending the multi-block copolymer with the second polymer. It should be noted, as the above weight average molecular weight in the present invention, value is measured by GPC (gel permeation chromatography) relative to polystyrene standards.

In an embodiment, the blend includes a plasticizer. Any reasonable plasticizer may be envisioned. Exemplary plasticizers include, but are not limited to, materials such as mineral oils, low molecular weight esters, glycol ethers, glycol ether esters of aliphatic acid, glycol ether esters of aliphatic diacid, glycol ether esters of cinnamic acid, polyethylene glycol, polypropylene glycol, ortho and terephthalates, citrates, adipates, combinations, mixtures, and the like. In a particular embodiment, the plasticizer includes a glycol ether, or esters of glycol ether with aliphatic acids or aliphatic diacides, or esters of glycol ether with cinnamic acid such as, for example, diethylene glycol dibutyl ether, bis[2-(2-butoxyethoxy)ethyl]adipate, bis(2-butoxyethyl)sebacate, bis[2-(2-butoxypropoxy)propyl]adipate, bis[2-(2-butoxypropoxy)propyl]sebacate, bis(2-ethoxyethyl)adipate, bis(2-ethoxyethyl)sebacate, dipropylene glycol methyl ether acetate, dipropylene glycol methyl ether cinnamate, diethylene glycol butyl ether cinnamate, dipropylene glycol butyl ether acetate, tripropylene glycol methyl ether acetate, tripropylene glycol methyl ether butyrate, tripropylene glycol butyl ether acetate, diethylene glycol methyl ether acetate, diethylene glycol butyl ether acetate, triethylene glycol butyl ether acetate, triethylene glycol methyl ether acetate, combinations thereof, and the like. In a particular embodiment, the plasticizer may be used to lower the glass transition temperature (Tg) of the resulting blend, enabling the blend to be within the elastomeric region and flexible at room temperature (i.e. 25° C.). The plasticizer may be present in an amount of about 1% to about 60%, such as about 2% to about 45%, by weight of the total weight of the blend.

In an exemplary embodiment, the blend further includes any additive envisioned such as fillers, dyes, pigments, modifiers, stabilizers, acid scavengers, compatibilizers, other polymers, or combinations thereof. Exemplary fillers include calcium carbonate, talc, radio-opaque fillers such as barium sulfate, bismuth oxychloride, wood flour, carbon black, any combinations thereof, and the like. Exemplary dyes include any reasonable dye envisioned. Exemplary modifiers include any reasonable modifiers such as additional nucleating agents like boron nitride or crosslinking agents such as silanes or diisocyanates. Exemplary stabilizers include any reasonable stabilizers such as hindered amines, phenolic UV stabilizers, metal based heat stabilizers, and combinations thereof. Exemplary acid scavengers include any reasonable acid scavengers such as calcium or zinc stearates. Exemplary compatibilizers include any reasonable compatibilizers such as low to medium molecular weight polymers acting similar to surfactants. Exemplary other polymers include any reasonable polymers such as PMMA block copolymers, thermoplastic polyurethanes, and other polar polymers and non-polar polymers. In a particular embodiment, additives may be used such as other polymers to lower the glass transition temperature (Tg) of the resulting blend.

Typically, the additive may be present at an amount of not greater than about 50% by weight of the total weight of the blend, such as not greater than about 40% by weight of the total weight of the blend, or even not greater than about 30% by weight of the total weight of the blend. Alternatively, the blend may be free of fillers, dyes, pigments, modifiers, stabilizers, plasticizers, acid scavengers, compatibilizers, other polymers, or combinations thereof.

In an embodiment, any method for obtaining the multi-block copolymer is envisioned. Conditions for obtaining the multi-block copolymer are dependent upon the chiral polymer chosen. As an example, a method for making the multi-block copolymer includes ionic polymerization of PMMA, serving as the rigid chiral block, with an acrylate based elastomeric block, such as a PMMA-nButyl acrylate copolymer. In an embodiment, the multi-block copolymer may include a styrene rigid and chiral block ionically polymerized with ethylene butadiene as the soft block. Or, for instance, when the chiral polymer is poly(lactic acid), the method for obtaining the multi-block copolymer includes ring-opening polymerization of a cyclic di-ester of a L-lactide or D-lactide. Ring-opening polymerization of the lactide is typically carried out in the presence of a polymerization catalyst. Any reasonable polymerization catalyst is envisioned. The polymerization catalyst may include organo-metallic catalysts, organic catalysts, enzymatic catalysts, the like, or combinations thereof. In an embodiment, the polymerization catalyst is an organo-metallic catalyst such as stannous octoate, stannous triflate, aluminium tris-(isopropoxide), and the like. Any reasonable amount of polymerization catalyst may be used to polymerize the cyclic di-ester of the L-lactide or D-lactide to form the multi-block copolymer. In an embodiment, the polymerization catalyst is present at not greater than about 1%, such as from about 0.05% to about 0.1% of the multi-block copolymer.

Once the multi-block copolymer is formed, the components of the blend of the multi-block copolymer with the second polymer may be melt processed by any known method to form the blend. In an embodiment, the multi-block copolymer with the second polymer may be mixed prior to processing by dry blending or compounding. The dry blend may be in powder, granular, or pellet form. The blend can be made by a continuous twin-screw compounding process or batch related Banbury process. Melting temperature may be at any reasonable temperature as long as the above multi-block copolymer and the second polymer can melt, however, it is desirably as low as possible in a degree that a molten mixture does not solidify, to suppress a decomposition reaction during melt mixing. Melting temperature is dependent upon the multi-block copolymer and second polymer chosen. In an exemplary embodiment, melt mixing is carried out at about 190° C. to about 220° C.

Once blended, the chiral and anti-chiral polymers are present at a ratio of about 1:99 to about 99:1 weight to weight based on the total weight of the blend, such as 95:5 to about 5:95 weight to weight based on the total weight of the blend. In a particular embodiment, the blend of the chiral polymer and the anti-chiral polymer from the multi-block copolymer and the second polymer form stereo complex sites. For instance, the L isomers and the D isomers of poly(lactic acid) are present at a ratio of about 1:99 to about 99:1 weight to weight based on the total weight of the blend, such as 95:5 to about 5:95 weight to weight based on the total weight of the blend. In a particular embodiment, the blend of the L isomers and the D isomers from the multi-block copolymer and the second polymer form stereo complex crystalline sites. In an embodiment, the amount of stereo complex crystalline sites in the blend is, but not limited to, about 3% to about 45%, such as about 8% to about 35%, as measured by vibrational spectroscopy or DSC. Further, the elastomeric polymer provides amorphous regions within and around the crystalline regions. In an embodiment, the blends have a continuous amorphous phase with the crystalline regions being a discontinuous portion. The elastomeric polymer is typically present in the blend at an amount of about 1% by weight to about 95% by weight of the total blend, such as about 1% by weight to about 60% by weight of the total blend.

Pellets of these blends may then be fed into a single screw extruder to make articles such as flexible tubing products. Blends can also be mixed in a single-screw extruder equipped with mixing elements and then extruded directly into articles such as tubing products. In a particular embodiment, the blend can be melt processed by any method envisioned known in the art such as laminating, casting, molding, and the like. In an embodiment, the blend can be injection molded. In an embodiment, any article can be made out of the blends depending on specific application needs.

In an embodiment, the blend may be formed into a single layer article, a multi-layer article, or can be laminated, coated, or formed on a substrate. Multi-layer articles may include layers such as reinforcing layers, adhesive layers, barrier layers, chemically resistant layers, metal layers, any combination thereof, and the like. The blend can be formed into any useful shape such as film, sheet, tubing, and the like. The blend may adhere or bond to other substrates such as polyolefins (polypropylene (PP), polyethylene (PE), and the like), polyesters, both aromatic and aliphatic, polyvinyl chloride (PVC), urethanes both cast and thermoplastic, silicone, and styrenics (polystyrene (PS), acrylonitrile butadiene styrene (ABS), high impact polystyrene (HIPS), and the like.)

In a particular embodiment, the blend may be used to produce tubing and hoses. For instance, the blend can be used as tubing or hosing to produce low toxicity pump tubing, reinforced hosing, chemically resistant hosing, braided hosing, and low permeability hosing and tubing. For instance, tubing may be provided that has any useful diameter size for the particular application chosen. In an embodiment, the tubing may have an outside diameter (OD) of up to about 2.0 inches, such as about 0.25 inch, 0.50 inch, and 1.0 inch. Tubing of the blend advantageously exhibits desired properties such as chemical stability and increased lifetime. For example, the tube may have a pump life greater than about 10 hours, such as greater than about 20 hours, or even greater as measured at 300 RPM using an EasyLoad II pump head.

In an embodiment, the resulting articles may have further desirable physical and mechanical properties. For instance, the articles are flexible, kink-resistant and appear transparent or at least translucent. In particular, the articles have desirable flexibility, substantial clarity or translucency, desirable glass transition temperatures and desirable high temperature stability. The articles of the blend may advantageously produce low durometer articles. For example, an article having a Shore A durometer of about 40 to Shore D durometer of about 50 having desirable mechanical properties may be formed. Such properties are indicative of a flexible material. In an embodiment, the article of the blend has a glass transition temperature (Tg) equal to, or less than a chiral/anti-chiral polymer composition without an elastomeric polymer block, i.e. a neat chiral/anti-chiral polymer system. For instance, when the chiral/anti-chiral polymers are poly(lactic acid), the article of the blend has a glass transition temperature (Tg) equal to, or less than a neat poly(lactic acid) composition. In an embodiment, the article using poly(lactic acid) as the chiral/anti-chiral polymer system has a glass transition temperature (Tg) of equal to, or less than about 70° C.

In addition to desirable hardness, the articles have advantageous physical properties, such as desirable elongation at break and 100% modulus. Elongation at break is determined using an Instron instrument in accordance with ASTM D-412 testing methods. For example, the articles may exhibit an elongation at break of greater than about 200% strain, such as greater than about 250%, such as greater than about 300%, or even greater than about 350%. In an embodiment, the blend has, but not limited to, a 100% modulus of about 0.5 MPa to about 20 MPa as measured by ASTM-D638

Applications for the polymeric blend are numerous. In particular, the non-toxic nature of the polymeric blend makes the material useful for any application where toxicity is undesired. For instance, the polymeric blend has potential for FDA, USP, and other regulatory approvals. In an exemplary embodiment, the polymeric blend may be used in applications such as industrial, medical, health care, biopharmaceutical, drinking water, food & beverage, laboratory, and the like. In an embodiment, the polymeric blend may also be safely disposed as it generates substantially no toxic gases when incinerated and is biodegradable into the environment if land filled.

EXAMPLES

Multi-Block Preparation

A triblock copolymer is synthesized by ring opening polymerization of D-lactide using PEG 12000 as an initiator and stannous octoate as a catalyst. Dry PEG 12000 is taken in a Flame-dried Schlenk Flask and D-lactide is added to it under nitrogen atmosphere. The flask is evacuated and filled with nitrogen three times and then placed in an oil bath maintained at 160° C. After 15 minutes, stannous octoate in about 0.2 mL toluene is injected into the flask. After 4 hours, the polymer obtained is dissolved in dichloromethane, precipitated in methanol or hexane and dried in vacuum. The triblock copolymer obtained is hereafter referred to as 232323 (where the numbers represent the degree of polymerization for each of the three blocks).

Blend Preparation.

Two types of samples are used in this study. Blends of the triblock copolymer and PLA 2002D (4.2% D) are prepared in a DSM twin screw mini-extruder (15 cc volume). Dog-bone samples for tensile testing are obtained using a DSM 10 cc injection mold. Blend 5.7 refers to a 94.3(PLLA)-5.7(triblock) (w/w) composition, while the Blend 15 refers to a 85(PLLA)-15(triblock) (w/w) composition. Compositions of the blends prepared are tabulated in Table 1. The dog bone samples are annealed at 80° C. for 4 hours and then kept at room temperature for 24 hours before testing. In order to carry out composition analysis, another set of samples are melted and pressed using a similar thermal profile. The actual samples used for mechanical testing are prepared by annealing the injection molded dog-bone samples at 80° C.

TABLE 1

| Sample | Tri232323 (5.7) | Tri232323 (15) |
|---|---|---|
| % Triblock in blend | 5.7 | 15 |
| % PEG in triblock | 23.4 | 23.4 |
| % PEG in blend | 1.33 | 3.51 |
| % PDLA in blend | 4.37 | 11.49 |
| % PLLA in blend | 94.3 | 85 |

Figure 2:
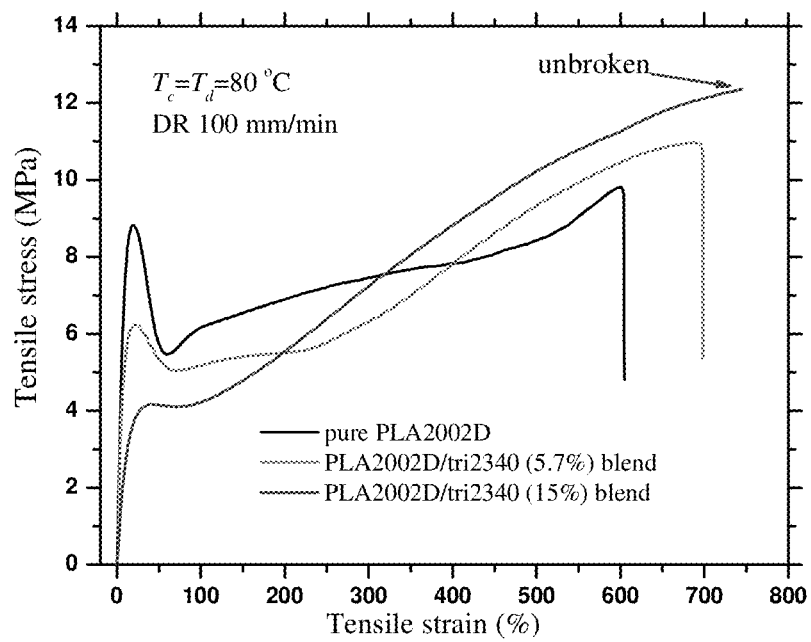
FIG. 2 includes a graphical illustration of stress strain curves at 80° C. of blends of a multi-block copolymer with a second polymer.
Figure 3:
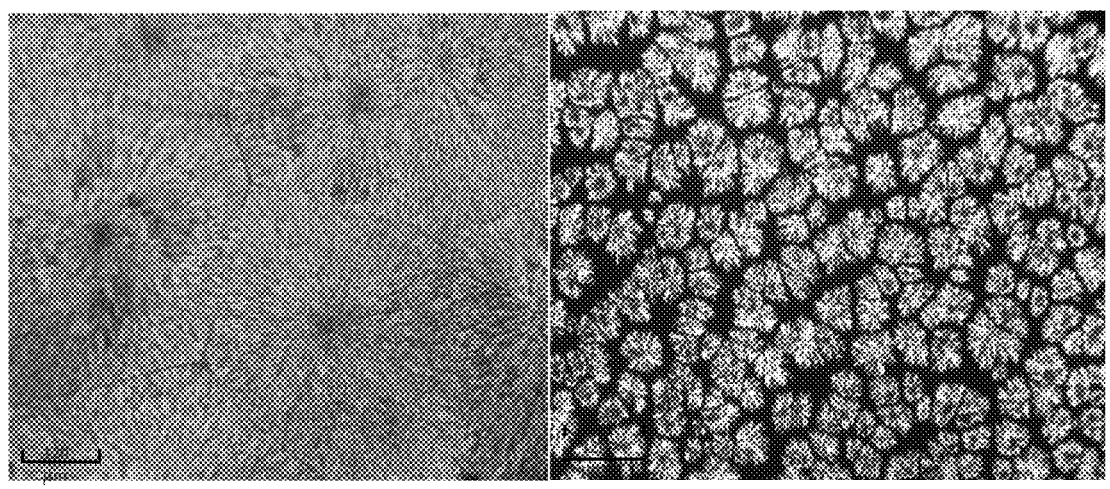
FIG. 3 includes an optical micrograph of (left) PLA2002D (isothermal crystallization performed at 140° C.); (right) and an exemplary blend of a multi-block copolymer with a second polymer (isothermal crystallization performed at 160° C.).

Dramatic improvements in mechanical properties of the blends compared to pure PLA can be seen in FIGS. 1 and 2. Tensile stress-tensile strain curves of pure PLA and its blends are at a draw rate of 100 mm/min at 80° C. It can be seen that as the triblock content increases, the elongation at break, stress at break and toughness increases. At 80° C., the samples are ductile with increasing triblock content. Notably, significant improvement in elongation at break is observed with a negligible loss in modulus for samples containing as low as 3% PEG in the blend.

PDLA40-PEG12K-PDLA40/PLLA Triblock Blends

Multiple PDLA40-PEG12K-PDLA40 triblocks are prepared using the above blend preparation. The plasticizer is bis(2-(2-butoxyethoxy)ethyl)adipate. The chain extender is a styrene-epoxy acrylate oligomer.

TABLE 2

| Ingredient | PLA 2002D (Wt %) | 40PDLA-12KPEG (Wt %) | Plasticizer (Wt %) | Chain extender (Wt %) |
|---|---|---|---|---|
| Composition A | 100 | 0 | 0 | 0 |
| Composition B | 85 | 15 | 0 | 0 |
| Composition C | 75 | 25 | 0 | 0 |
| Composition D | 65 | 35 | 0 | 0 |
| Composition E | 60 | 40 | 0 | 0 |
| Composition F | 50 | 50 | 0 | 0 |
| Composition J | 59 | 30 | 10 | 1 |

The blends are then formed into films and molds and tested for modulus, strain at break, glass transition temperature (Tg) and crystallinity.

TABLE 3

| | % triblock | % PEG | % PDLA | % P″ | % PLA 2002D | Modulus (Mpa) | Strain at Break (%) | Tg (° C.) | Xty (%) |
|---|---|---|---|---|---|---|---|---|---|
| A | | 0 | 0 | 0 | 100 | 2370 ± 340 | 6.8 ± 1 | 58-65 | 0 |
| B | 15 | 10.1 | 4.9 | 0 | 85 | 2400 ± 60 | 4.6 ± 0.5 | 40-51 | 1 |
| C | 25 | 16.9 | 8.1 | 0 | 75 | 1600 ± 265 | 209 ± 42 | 18-48 | 5 |
| D | 35 | 23.6 | 11.4 | 0 | 65 | 540 ± 110 | 209 ± 26 | −54-54 | 8 |
| E | 40 | 27 | 13 | 0 | 60 | 197 ± 19 | 220 ± 15 | −58-63 | 11 |
| F | 50 | 33.8 | 16.2 | 0 | 50 | 170 ± 49 | 240 ± 30 | −56-63 | 14 |
| J | 30 | 20.3 | 9.7 | 10 | 60 | 60 ± 4 | 225 ± 12 | −57-63 | 8 |

As seen in Table 3, the addition of the miscible midblock improves the flexibility of the resulting blend compared to the pure poly(lactic acid). Furthermore, the addition of the midblock lowers as well as broadens the glass transition temperature (compositions B-J) compared to the pure poly(lactic acid). As seen in composition J, the addition of the plasticizer (% p″) decreases the modulus and strain at break compared to the triblocks without plasticizer (compositions B-F).

PDLA40-PEPG12K-PDLA40/PLLA Triblock Blends

Multiple PDLA40-PEPG12K-PDLA40 triblocks are prepared using the above blend preparation. The plasticizer is bis(2-(2-butoxyethoxy)ethyl)adipate. The chain extender is a styrene-epoxy acrylate oligomer.

TABLE 4

| Ingredient | PLA 2002D (Wt %) | 40PDLA-12KPEPG (Wt %) | Plasticizer (Wt %) | Chain extender (Wt %) |
|---|---|---|---|---|
| Composition A | 100 | 0 | 0 | 0 |
| Composition B | 85 | 15 | 0 | 0 |
| Composition C | 75 | 25 | 0 | 0 |
| Composition D | 65 | 35 | 0 | 0 |
| Composition E | 60 | 40 | 0 | 0 |
| Composition F | 50 | 50 | 0 | 0 |
| Composition G | 74 | 15 | 10 | 1 |
| Composition H | 69 | 15 | 15 | 1 |
| Composition I | 64 | 25 | 10 | 1 |
| Composition J | 59 | 30 | 10 | 1 |

The blends are then formed into films and molds and tested for modulus, strain at break, glass transition temperature (Tg) and crystallinity.

TABLE 5

| | % triblock | % PEG | % PDLA | % P$^r$ | % PLA 2002D | Modulus (Mpa) | Strain at Break (%) | Tg (° C.) | Xty (%) |
|---|---|---|---|---|---|---|---|---|---|
| A | 0 | 0 | 0 | 0 | 100 | 2370 ± 340 | 6.8 ± 1 | 58-65 | 0 |
| B | 15 | 10.1 | 4.9 | 0 | 85 | 1840 ± 210 | 6.6 ± 3.5 | 34-47 | 1 |
| C | 25 | 16.9 | 8.1 | 0 | 75 | 670 ± 180 | 215 ± 24 | −29-48 | 5 |
| D | 35 | 23.6 | 11.4 | 0 | 65 | 410 ± 185 | 240 ± 16 | −36-60 | 14 |
| E | 40 | 27 | 13 | 0 | 60 | 330 ± 130 | 253 ± 15 | −43-58 | 16 |
| F | 50 | 33.8 | 16.2 | 0 | 50 | NA | NA | −55-59 | 19 |
| J | 30 | 20.3 | 9.7 | 10 | 60 | 62 ± 13 | 167 ± 30 | −46-65 | 10 |

As seen in Table 5, the addition of the miscible midblock improves the flexibility of the resulting blend compared to the pure poly(lactic acid). Furthermore, the addition of the midblock lowers as well as broadens the glass transition temperature (compositions B-J) compared to the pure poly(lactic acid). As seen in composition J, the addition of the plasticizer (% p$^r$) decreases the modulus and strain at break compared to the triblocks without plasticizer (compositions B-F).

Various Triblocks

Multiple triblocks are prepared and tested for modulus, strain, glass transition temperature and crystallinity. As seen, the PX-BY-PX nomenclature, "P" is a PDLA endblock with "X" being the molecular weight. "B" may be the PEG (P) or the PEPG (PP) (also referenced as PEG/PPG) elastomeric block with "Y" being the molecular weight. The compositions and properties can be found in Table 6.

sition temperature is broadened with the use of the elastomeric midblock to provide a flexible blend. Further, the crystallinity can be controlled. For instance, when comparing P25-P12k-P25, P40-P12k-P40, and P80-P12k-P80, the increase of the PDLA block molecular weight increases the degree of crystallinity.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the

TABLE 6

| triblock | | % triblock | % PEG/ PEPG | % PDLA | % Pr | % PLA 2002D | Modulus (Mpa) | Strain at Break (%) | Tg (° C.) | Xty (%) |
|---|---|---|---|---|---|---|---|---|---|---|
| P40-P12k-P40 | E | 40 | 27 | 13 | 0 | 60 | 197 ± 19 | 220 ± 15 | −58-63 | 11 |
| P40-PP12k-P40 | E | 40 | 27 | 13 | 0 | 60 | 330 ± 130 | 253 ± 15 | −43-58 | 16 |
| P80-P12k-P80 | E | 40 | 20.4 | 19.6 | 0 | 60 | 700 ± 58 | 142 ± 23 | −39-54 | 29 |
| P40-P6k-P40 | E | 40 | 20.4 | 19.6 | 0 | 60 | 513 ± 27 | 132 ± 47 | −39-54 | 29 |
| P25-P12k-P25 | E | 40 | 30.8 | 92 | 0 | 60 | 114 ± 4 | 250 ± 50 | −55-57 | 6 |
| P40-P12k-P40 | J | 30 | 20.3 | 9.7 | 10 | 60 | 60 ± 4 | 225 ± 12 | −57-63 | 8 |
| P40-PP12k-P40 | J | 30 | 20.3 | 9.7 | 10 | 60 | 62 ± 13 | 167 ± 30 | −46-65 | 10 |
| P80-P12k-P80 | J | 30 | 15.3 | 14.7 | 10 | 60 | 300 ± 20 | 167 ± 10 | −43-63 | 25 |
| P40-P6k-P40 | J | 30 | 15.3 | 14.7 | 10 | 60 | 200 ± 50 | 168 ± 23 | −43-63 | 19 |
| P25-P12k-P25 | J | 30 | 23.1 | 6.9 | 10 | 60 | 27 ± 4 | 324 ± 16 | −50-62 | 5 |

Clearly, materials with a range of modulus, elongation at break, and crystallinity can be obtained depending on the triblock and blend composition. For instance, the glass transcope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A composition comprising a melt blend of:
   (a) a multi-block copolymer including at least one block of an at least semi-miscible elastomeric polymer and at least two end blocks of a first polymer including a chiral polymer having a stereo isomeric configuration; and
   (b) a second polymer consisting essentially of an anti-chiral polymer corresponding to the chiral polymer in (a), wherein the second polymer includes an opposite handed stereo isomeric configuration to the chiral polymer in (a);
   wherein the melt blend of the multi-block copolymer and the second polymer is in the absence of a solvent and forms a continuous amorphous region with stereo complex crystalline sites dispersed within the continuous amorphous region, wherein the amount of stereo complex crystalline sites in the blend is about 3% to about 35%.

2. The composition of claim 1, wherein the first polymer and the second polymer include the chiral polymer and the anti-chiral polymer of poly(lactic acid); poly(3-hexylthiophene); syndiotactic polypropylene; ionomers; polymethacrylates; polystyrene; copolymers of polystyrene; poly(β-propiolactones); polyenantiomers; or combinations thereof.

3. The composition of claim 2, wherein the first polymer and the second polymer include the chiral polymer and the anti-chiral polymer of poly(lactic acid).

4. The composition of claim 1, wherein the elastomeric polymer is an ether, an olefin, a vinyl, a polyurethane, an acrylate, a vinyl alcohol, an ethylene copolymer, an ester, a silicone, a fluoropolymer, or combination thereof.

5. The composition of claim 4, wherein the elastomeric polymer is polyethylene oxide (PEO), polyethylene glycol (PEG), polytriethylene glycol, polytetraethylene glycol, polybutadiene, polyisobutylene, polyisoprene, polystyrene-butadiene, acrylonitrile rubber, derivatives of vegetable oils, polypropylene glycol (PPG), polytetra methylene ether glycol (PTMEG), polycaprolactone, poly(para-dioxanone), poly(propylene carbonate), poly(tetramethyleneadipate-co-terephthalate), poly(butylene adipate-co-terephtalate), poly(butylene succinate), polyhydroxyalkanoates, blends, or combinations thereof.

6. The composition of claim 1, wherein the multi-block copolymer is a diblock copolymer, a triblock copolymer, a star copolymer, a graft copolymer, or a hyper-branched copolymer.

7. The composition of claim 1, having a shore A durometer of about 40 to shore D of about 50.

8. The composition of claim 1, having a glass transition temperature (Tg) equal to, or less than an chiral/anti-chiral polymer composition without an elastomeric polymer block.

9. The composition of claim 1, further comprising a plasticizer.

10. The composition of claim 9, wherein the plasticizer is a glycol ether ester.

11. A flexible material comprising a melt blend of:
    (a) a multi-block copolymer including at least one block of an at least semi-miscible elastomeric polymer and at least two end blocks of a first polymer including a chiral polymer having a stereo isomeric configuration; and
    (b) a second polymer consisting essentially of an anti-chiral polymer corresponding to the chiral polymer in (a), wherein the second polymer includes an opposite handed stereo isomeric configuration to the chiral polymer in (a);
    wherein the melt blend of the multi-block copolymer and the second polymer is in the absence of a solvent and forms a continuous amorphous region with stereo complex crystalline sites dispersed within the continuous amorphous region, wherein the amount of stereo complex crystalline sites in the blend is about 3% to about 35%.

12. The flexible material of claim 11, wherein the first polymer and the second polymer include the chiral polymer and the anti-chiral polymer of poly(lactic acid); poly(3-hexylthiophene); syndiotactic polypropylene; ionomers; polymethacrylates; polystyrene; copolymers of polystyrene; poly(β-propiolactones); polyenantiomers; or combinations thereof.

13. The flexible material of claim 12, wherein the first polymer and the second polymer include the chiral polymer and the anti-chiral polymer of poly(lactic acid).

14. The flexible material of claim 11, wherein the elastomeric polymer is an ether, an olefin, a vinyl, a polyurethane, an acrylate, a vinyl alcohol, an ethylene copolymer, an ester, a silicone, a fluoropolymer, or combination thereof.

15. The flexible material of claim 11, having a glass transition temperature (Tg) equal to, or less than an chiral/anti-chiral polymer without an elastomeric polymer block.

16. The flexible material of claim 11, further comprising a plasticizer.

17. A method of making a melt blend composition comprising:
    providing (a) a multi-block copolymer including at least one block of an at least semi-miscible elastomeric polymer and at least two end blocks of a first polymer including a chiral polymer having a stereo isomeric configuration;
    melt blending the multi-block copolymer in the absence of a solvent with (b) a second polymer consisting essentially of an anti-chiral polymer corresponding to the chiral polymer in (a), wherein the second polymer includes an opposite handed stereo isomeric configuration to the chiral polymer in (a), wherein the melt blend of the multi-block copolymer and the second polymer is in the absence of a solvent and forms a continuous amorphous region with stereo complex crystalline sites dispersed within the continuous amorphous region, wherein the amount of stereo complex crystalline sites in the blend is about 3% to about 35%; and
    extruding or molding the blend.

18. The method of claim 17, wherein the first polymer and the second polymer include the chiral polymer and the anti-chiral polymer of poly(lactic acid); poly(3-hexylthiophene); syndiotactic polypropylene; ionomers; polymethacrylates such as polymethylmethacrylate, poly(N,N-dimethylamino- 2-ethyl methacrylate); polystyrene; copolymers of polystyrene; poly(β-propiolactones); polyenantiomers; or combinations thereof.

19. The method of claim 18, wherein the first polymer and the second polymer include the chiral polymer and the anti-chiral polymer of poly(lactic acid).

20. The method of claim 17, wherein the elastomeric polymer is an ether, an olefin, a vinyl, a polyurethane, an acrylate, a vinyl alcohol, an ethylene copolymer, an ester, a silicone, a fluoropolymer, or combination thereof.

21. The method of claim 17, wherein providing the multi-block copolymer includes polymerizing the first polymer with the elastomeric polymer and a catalyst.

22. The method of claim 17, wherein the blend has a glass transition temperature (Tg) equal to, or less than an chiral/anti-chiral polymer without an elastomeric polymer block.

23. The method of claim 17, further comprising blending in the blend composition a plasticizer.

24. The method of claim 17, wherein extruding or molding the blend includes extruding or injection molding the blend into a flexible component or product.

* * * * *